United States Patent
Yea et al.

(10) Patent No.: US 11,682,144 B2
(45) Date of Patent: Jun. 20, 2023

(54) TECHNIQUES AND APPARATUS FOR INTER-CHANNEL PREDICTION AND TRANSFORM FOR POINT-CLOUD ATTRIBUTE CODING

(71) Applicant: TENCENT AMERICA LLC, Palo Alto, CA (US)

(72) Inventors: Sehoon Yea, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 275 days.

(21) Appl. No.: 17/030,779

(22) Filed: Sep. 24, 2020

(65) Prior Publication Data

US 2021/0104072 A1 Apr. 8, 2021

Related U.S. Application Data

(60) Provisional application No. 62/911,327, filed on Oct. 6, 2019.

(51) Int. Cl.
*G06T 9/00* (2006.01)
*G06T 3/40* (2006.01)
*G06T 19/20* (2011.01)
*H04N 19/597* (2014.01)

(52) U.S. Cl.
CPC .................. *G06T 9/00* (2013.01); *G06T 3/40* (2013.01); *G06T 19/20* (2013.01); *G06T 2210/56* (2013.01); *G06T 2219/2012* (2013.01); *H04N 19/597* (2014.11)

(58) Field of Classification Search
CPC .. G06T 9/00; G06T 3/40; G06T 19/20; G06T 2210/56; G06T 2219/2012; G06T 9/001; H04N 19/597
See application file for complete search history.

(56) References Cited

U.S. PATENT DOCUMENTS

| | | | |
|---|---|---|---|
| 2005/0259730 A1 | 11/2005 | Sun | |
| 2015/0201176 A1* | 7/2015 | Graziosi | H04N 13/111 348/43 |
| 2015/0264374 A1 | 9/2015 | Xiu et al. | |
| 2015/0373327 A1* | 12/2015 | Zhang | H04N 19/70 375/240.03 |
| 2018/0268570 A1 | 9/2018 | Budagavi et al. | |
| 2019/0087978 A1 | 3/2019 | Tourapis et al. | |

OTHER PUBLICATIONS

Malvar et al., "YCoCg-R: A Color Space with RGB Reversibility and Low Dynamic Range", 2003, Microsoft (Year: 2003).*
Thanou, "Graph-Based Compression of Dynamic 3D Point Cloud Sequences", IEEE, 2016 (Year: 2016).*
Zhang et al, "Adaptive Color-Space Transform in HEVC Screen Content Coding", 201612, IEEE (Year: 2016).*

(Continued)

*Primary Examiner* — YuJang Tswei
(74) *Attorney, Agent, or Firm* — Sughrue Mion, PLLC (57) ABSTRACT

A method and device for coding attribute information of a point cloud may include obtaining the point cloud including a set of points in a three-dimensional space. The attribute information of the point cloud is coded using a YCoCg-R transform.

20 Claims, 3 Drawing Sheets

(56) References Cited

OTHER PUBLICATIONS

Tan et al., "Residual DPCM for Lossless Coding in HEVC", 2013, IEEE (Year: 2013).*
Wige et al., "Efficient Coding of Video Sequences By Non-Local In-Loop Denoising of Reference Frames", 2011, IEEE (Year: 2011).*
International Search Report dated Jan. 22, 2021 from the International Searching Authority in International Application No. PCT/US2020/053977.
Written Opinion dated Jan. 22, 2021 from the International Bureau in International Application No. PCT/US2020/053977.
Office Action dated Jan. 4, 2023 issued by the Japanese Patent Office in Japanese Application No. 2021-556273.

\* cited by examiner

TECHNIQUES AND APPARATUS FOR INTER-CHANNEL PREDICTION AND TRANSFORM FOR POINT-CLOUD ATTRIBUTE CODING

CROSS-REFERENCE TO RELATED APPLICATION(S)

This application is based on and claims priority under 35 U.S.C. § 119 to U.S. Provisional Patent Application No. 62/911,327, filed on Oct. 6, 2019, in the U.S. Patent & Trademark Office, the disclosure of which is incorporated by reference herein in its entirety.

BACKGROUND

Advanced three dimensional (3D) representations of the world are enabling more immersive forms of interaction and communication, and also allow machines to understand, interpret, and navigate our world. 3D point clouds have emerged as an enabling representation of such information. A number of use cases associated with point cloud data have been identified, and corresponding requirements for point cloud representation and compression have been developed.

A point cloud is a set of points in a 3D space, each with associated attributes, e.g. color, material properties, etc. Point clouds can be used to reconstruct an object or a scene as a composition of such points. They can be captured using multiple cameras and depth sensors in various setups, and may be made up of thousands up to billions of points in order to realistically represent reconstructed scenes.

Compression technologies are needed to reduce the amount of data required to represent a point cloud. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, etc. MPEG has started working on a standard to address compression of geometry and attributes such as colors and reflectance, scalable/progressive coding, coding of sequences of point clouds captured over time, and random access to subsets of the point cloud.

SUMMARY

The present disclosure is directed to point-cloud coding technologies. The disclosed subject matter relates to video coding and decoding, video encoders and decoders performing the same, and more specifically, to the coding of attribute information of point cloud samples.

According to an aspect of the disclosure, a method for coding attribute information of a point cloud may be performed by at least one processor and may include obtaining the point cloud including a set of points in a three-dimensional space; and coding the attribute information of the point cloud using a YCoCg-R transform.

According to an aspect of the disclosure, a device for coding attribute information of a point cloud may include at least one memory configured to store program code; and at least one processor configured to read the program code and operate as instructed by the program code, the program code including: obtaining code configured to cause the at least one processor to obtain the point cloud including a set of points in a three-dimensional space; and coding code configured to cause the at least one processor to code the attribute information of the point cloud using a YCoCg-R transform.

According to an aspect of the disclosure, a non-transitory computer-readable medium may store instructions, the instructions comprising: one or more instructions that, when executed by one or more processors of a device for coding attribute information of a point cloud, cause the one or more processors to: obtain the point cloud including a set of points in a three-dimensional space; and code the attribute information of the point cloud using a YCoCg-R transform.

DETAILED DESCRIPTION

The Graph-based Point Cloud Compression (G-PCC) model separately compresses the geometry information and the associated attributes such as color or reflectance. The geometry information, which is the 3D coordinates of the point clouds, is coded by octree-decomposition of its occupancy information. On the other hand, the attribute information is encoded by a Differential Pulse Code Modulation (DPCM)-like technique which performs closed-loop prediction of Level-Of-Detail (LOD) data between different levels. The LOD information is built in an identical manner at the encoder and the decoder based upon the decoded geometry information. Basically, the LOD is built in such a way that more detailed information of the given point cloud is obtained in a successive manner as more LOD is provided. When the sample-based prediction is performed for attribute coding, the nearest-neighbor based tree search is leveraged to find neighboring samples to do a weighted prediction. The weight is calculated as the inverse of the geometric distance of each of the neighboring samples.

In G-PCC attributes coding, LOD of each 3D point is generated based on the distance of each point, then the attributes value of 3D points in each LOD is encoded by applying prediction in LOD-based order.

The anchor method in G-PCC proceeds as follows. First, the variability of its neighborhood is computed to check how different the neighbor values are and if the variability is lower than a threshold, the distance-based weighted average prediction is conducted as follows: the attribute values $(\alpha_i)_{i \in 0 \ldots k-1}$ are predicted by using a linear interpolation process based on the distances of the nearest neighbors of point i. Let $\aleph_i$ be the set of the k-nearest neighbors of the current point i and let $(\tilde{a}_j)_{j \in \aleph_i}$ be their decoded/reconstructed attribute values and $(\delta_j)_{j \in \aleph_i}$ their distances to the current point. The predicted attribute value $\hat{a}_i$ is then given by:

$$\hat{a}_i = \text{Round}\left(\frac{1}{k}\sum_{j \in N_i} \frac{\frac{1}{\delta_j^2}}{\Sigma_{j \in N_i} \frac{1}{\delta_j^2}} \tilde{a}_j\right)$$

Note the geometric locations of all the point clouds are already available when attributes are coded. In addition, the neighboring points together with their reconstructed attribute values are available both at the encoder and the decoder as a KD-Tree structure is used to facilitate the nearest-neighbor search for each point in an identical manner.

Secondly, if the variability is higher than the threshold, a rate-distortion optimized predictor selection is performed. Multiple predictor candidates are created based on the result of neighbor point search in generating LOD. For example, when the attributes value of P2 is encoded by using prediction, a distance based weighted average value of P0, P5 and P4 is set to predictor index equal to 0. Then, the value of nearest neighbor point P4 is set to predictor index equal to 1. Moreover, the value of next nearest neighbor point P5 and P0 are set to predictor index equal to 2 and 3 respectively (Table 1). After creating predictor candidates, best predictor is selected by applying a rate-distortion optimization procedure and then, selected predictor index is arithmetically encoded.

| Predictor index | Predicted value |
|---|---|
| 0 | average |
| 1 | P4 ($1^{st}$ nearest point) |
| 2 | P5 ($2^{nd}$ nearest point) |
| 3 | P0 ($3^{rd}$ nearest point) |

The maximum number of predictor candidate (MaxNumCand) is defined and it is encoded into attributes header. In the current implementation, MaxNumCand is set to equal to numberOfNearestNeighborsInPrediction+1 and it is used in encoding and decoding predictor index with truncated unary binarization.

The Lifting Transform builds on top of the Predicting Transform described in the previous section. The main difference between the prediction scheme and the lifting scheme is the introduction of an update operator.

In order to facilitate the prediction and update steps in lifting, one has to split the signal into two sets of high-correlation at each stage of decomposition. In the lifting scheme in G-PCC, the splitting is performed by leveraging the LOD structure where such high-correlation is expected among levels and each level is constructed by nearest-neighbor search to organize the non-uniform point clouds into a structured data. A Prediction/Update (P/U) decomposition step at level N results in a detail signal D(N-1) and an approximation signal A(N-1), which is further decomposed into D(N-2) and A(N-2). This step is repeatedly applied until the base layer approximation signal A(1) is obtained.

Consequently, instead of coding the input attribute signal itself which consists of LOD(N), . . . , LOD(1), one ends up coding D(N-1), D(N-2), . . . , D(1), A(1) in the lifting scheme. Note that application of efficient P/U steps often leads to sparse subbands "coefficients" in D(N-1), . . . , D(1), thereby providing the transform coding gain advantage.

The distance-based weighted average prediction described above for Predicting-Transform is used for the Prediction step in the lifting as the anchor method in G-PCC.

For point cloud attributes such as color, there are significant redundancy among channels.

In order to improve coding efficiency, a color space conversion is often performed as a pre-/post-processing step. One problem of color-space conversion as a pre-/post-processing step is that they often lack orthonormality and optimizing the codec performance in the converted color space does not necessarily translate into a good quality in the original space. In addition, lossless color transforms tend to have extended bit-depths especially when one tries to approximate the non-integer color transform with a good precision. This can be an issue depending on the implementation constraints in many practical systems.

In this disclosure, methods are proposed to efficiently perform inter-channel decorrelation for compression efficiency.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The disclosure is directed to G-PCC predictor design described above. These methods can be applied to similar codecs designed for point clouds.

In this disclosure, techniques are disclosed that can avoid the aforementioned problems of using color-space transform as a conversion tool for coding efficiency.

According to an embodiment, a technique uses YCoCg-R as a lossless inloop transform of prediction residuals in DPCM (aka Predicting Transform) for G-PCC to decorrelate inter-channel dependency while maintaining near-lossless and lossless reconstruction. According to another embodiment, a technique uses another step of prediction to predict residual values of other channels in DPCM for G-PCC.

The YCoCg transform is given as follows:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \quad \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

As a lossless transform derived from YCoCg, the forward YCoCg-R is given as follows:

$Co=R-B$ $t=B+(Co>>1)$ $Cg=G-t$ $Y=t+(Cg>>1)$

The backward YCoCg-R reverses the above process as follows:

$t=Y-(Cg>>1)$ $G=Cg+t;$ $B=t-(Co>>1)$ $R=B+Co$

When applying this as a residual-transform, the signal R, G, and B are prediction residuals of each channel resulting from per channel prediction in G-PCC.

Another way of decorrelating a multi-channel signal is to use a predictor. In this disclosure, a technique uses a predictor to predict residual signals of the channels so that the second order residual will be quantized and entropy-coded instead of the original residuals.

For G-PCC prediction design, the simplest version can be described as follows, where the bold parts are changes needed on top of the current TMC3 specification. Any general form of linear or nonlinear predictor function can be introduced for possible improvement of this simplest prediction.

As used below, "X" represents a channel X signal, "X_pred" represents a predicted channel X signal (obtained from reconstructed neighbor samples in G-PCC), "X delta index" represents a quantization index of the prediction residual of channel X, "X delta recon" represents a reconstructed residual for channel X, "X_recon" represents a reconstructed channel X signal, and "X_delta_residual_index" represents the quantization index of the residual from the residual-prediction

```
For encoding:
                    G-Channel:
                        G_delta_index <- Quantize(G- G_pred)
            G_delta_recon <- InverseQuantize(G_delta_index)
                    G_recon <- G_pred + G_delta_recon
                    EntopyEncode(G_delta_index)
                    C-Channels ('C' can be either R or B):
                    C_delta_index <- Quantize(C- C_pred)
            C_delta_recon <- InverseQuantize(C_delta_index)
    C_delta_residual_index <- Quantize (C_delta_recon - G_delta_recon)
C_delta_recon <- InverseQuantize(C_delta_residual_index) + G_delta_recon
                    C_recon <- C_pred + C_delta_recon
                    EntopyEncode(C_delta_residual_index)
    For decoding:
                    G-Channel
                    G_delta_index <- EntropyDecode( )
            G_delta_recon <- InverseQuantize(G_delta_index)
                    G_recon <- G_pred + G_delta_recon
                    // C-Channels ('C' can be either R or B)
            C_delta_residual_index <- EntropyDecode( )
C_delta_recon <- InverseQuantize(C_delta_residual_index) + G_delta_recon
                    C_recon <- C_pred + C_delta_recon
```

Advantages of the inter-channel residual predictor for G-PCC and similar point cloud codecs include the following: the change in the decoding process is very minor; it does not require any elaborate multi-channel signal model, and unlike other lossless color transform-based approaches for inter-channel decorrelation including an inloop residual transform, the proposed method can control the fidelity of the signal in the original domain in terms of Hausdorff metric. This is because the quantization is performed in the original (RGB color-) space.

This following provides an embodiment example of the inter-channel residual predictor in the G-PCC working-draft specification.

In the attribute parameter set syntax, one can add a flag to adaptively enable/disable the proposed inter-channel residual predictor.

Attribute Parameter Set Syntax:

|  | Descriptor |
|---|---|
| attribute_parameter_set( ) { |  |
|     aps_attr_parameter_set_id | ue(v) |
|     aps_seq_parameter_set_id | ue(v) |
|     attr_coding_type | ue(v) |
|     aps_attr_initial_qp | ue(v) |
|     aps_attr_chroma_qp_offset | se(v) |
|     aps_slice_qp_delta_present_flag | u(1) |
|     isLifting = ( attr_coding_type == 0 \|\| attr_coding_type == 2 ) ? 1 : 0 |  |
|     if( isLifting ) { |  |
|         lifting_num_pred_nearest_neighbours | ue(v) |
|         lifting_max_num_direct_predictors | ue(v) |
|         lifting_search_range_minus1 | ue(v) |
|         lifting_lod_regular_sampling_enabled_flag | u(1) |
|         lifting_num_detail_levels_minus1 | ue(v) |
|         for( idx = 0; idx <= num_detail_levels_minus1; idx++ ) { |  |
|             if ( lifting_lod_decimation_enabled_flag ) |  |
|                 lifting_sampling_period[ idx ] | ue(v) |
|             else |  |
|                 lifting_sampling_distance_squared[ idx ] | ue(v) |
|         } |  |
|     } |  |
|     if( attr_coding_type == 0 ) { |  |
|         lifting_adaptive_prediction_threshold | ue(v) |
|         lifting_intra_lod_prediction_num_layers | uefv) |
|     lifting_residual_prediction_enabled_flag | u(1) |
|     } |  |
|     if( attribute_coding_type == 1 ) { //RAHT |  |
|         raht_prediction_enabled_flag | u(1) |
|         raht_depth_minus1 | ue(v) |
|     } |  |
|     if( attribute_coding_type == 2 ) { |  |
|         lifting_scalability_enabled_flag | u(1) |
|     } |  |
|     aps_extension_present_flag | u(1) |
|     if( aps_extension_present_flag ) |  |
|         while( more_data_in_byte_stream( ) ) |  |
|             aps_extension_data_flag | u(1) |
|     byte_alignment( ) |  |
| } |  |

Attribute Parameter Set Semantics:

"lifting_residual_prediction_enabled_flag" equal to 1 specifies that the attribute decoding process performs the residual prediction.

Inverse Quantization Process:

```
endIndex = pointCountPerLevelOfDetail[ 0 ];
for (i=0, d = 0; i< PointNum; i++) {
    if ( i == endIndex ) {
        endIndex = pointCountPerLevelOfDetail[ ++d ];
        QstepY = ( d < num_layer ) ? SliceQstepY[ d ] : SliceQstepY[ num_layer – 1 ];
        QstepC = ( d < num_layer ) ? SliceQstepC[ d ] : SliceQstepC[ num_layer – 1 ];
    }
    for (a=0; a< attrCnt; a++)
    {
            if (a==0 || lifting_residual_prediction_enabled_flag==0)
            unquantAttributeCoefficients [ i ][ a ] = quantAttributeCoefficients[ i ][ a ] ×
                    ( a == 0 ? QstepY : QstepC);
            else
                unquantAttributeCoefficients [ i ][ a ] = quantAttributeCoefficients[ i ][ a ] ×
                    ( a == 0 ? QstepY : QstepC) + unquantAttributeCoefficients[i][0];
    }
}
```

The disclosure applies equally to both the inloop color-residual transform and color-residual prediction under the context of DPCM prediction (aka Predicting-Transform) in G-PCC. These two techniques will be called the interchannel tool.

In this disclosure, several methods of a conditional check are proposed to be used for deciding whether to apply the interchannel tool to the current point.

In an embodiment, the maximum difference of reconstructed residual values of three channels are computed for each of nearest-neighbors. More specifically, the decoder can track how many neighbors experienced reduced residual magnitude/variance after applying the interchannel tool by a set threshold. Especially when the three reconstructed residual values are relatively even, the chances are the decorrelation was not successful. This needs a bookkeeping of one-flag to indicate the result of such testing per each point when decoded. Also one can do a majority-voting when making a decision.

In another embodiment, the maximum absolute difference values of three channels from neighbor points are compared. When there is a significant difference in the variability of values among color channels, the chances are that predicting one from another can be difficult.

Any measure that can identify interchannel correlation from neighbor samples can be incorporated to determine the use of the interchannel tools.

In another embodiment, a tile/slice-level (e.g., in tile/slice header) or a video/picture-level (e.g., in SPS/PPS) flag can be signaled to enable/disable the proposed residual transform or prediction. The signaling can be applied to any grouping of point-cloud pixels that constitutes a coding-unit.

Since the detail subband coefficients are nothing but the output from the Predict-step of lifting, these are essentially prediction residual signals and they are likely be similar among different color channels given an identical prediction strategy.

For G-PCC lifting design, the simplest version can be described as follows, where the bold parts are changes needed on top of the current TMC3 specification. Any general form of linear or nonlinear predictor function can be introduced for possible improvement of this simplest prediction.

As used below, "X" represents channel X signal, "X_coeff_index" represents quantization index of a lifting coefficient of channel X, "X_coeff_recon" represents reconstructed lifting coefficient for channel X, "X_recon" represents reconstructed channel X signal, "X_coeff_residual_index" represents the quantization index of the residual from the residual-prediction, "quantWeight" represents weighting factor used in G-PCC which is applied to the lifting coefficient before quantization at the encoder and after dequantization at the decoder.

```
Encoding:
                    G-Channel
                        G_coeff_index <- Quantize(G)
                G_coeff_recon <- InverseQuantize(G_coeff_index)
                    G_recon <- G_coeff_recon/quantWeight
                        EntropyEncode(G_coeff_index)
                    // C-Channels ('C' can be either R or B)
                        C_coeff_index <- Quantize(C)
                C_coeff_recon <- InverseQuantize(C_coeff_index)
        C_coeff_residual_index <- Quantize (C_coeff_recon – G_coeff_recon)
C_ceoff_recon <- InverseQuantize(C_coeff_residual_index) + G_coeff_recon
                    C_recon <- C_coeff_recon/quantWeight
                        EntropyEncode(C_coeff_residual_index)
Decoding
                    /G-Channel
                        G_coeff_index <- EntropyDecode( )
                G_coeff_recon <- InverseQuantize(G_coeff_index)
                    G_recon <- G_coeff_recon/quantWeight
                    // C-Channels ('C' can be either R or B)
                    C_coeff_residual_index <- EntropyDecode( )
```

-continued

```
C_coeff_recon <- InverseQuantize(C_coeff_residual_index) + G_coeff_recon
                C_recon <- C_coeff_recon/quantWeight
```

Figure 1:
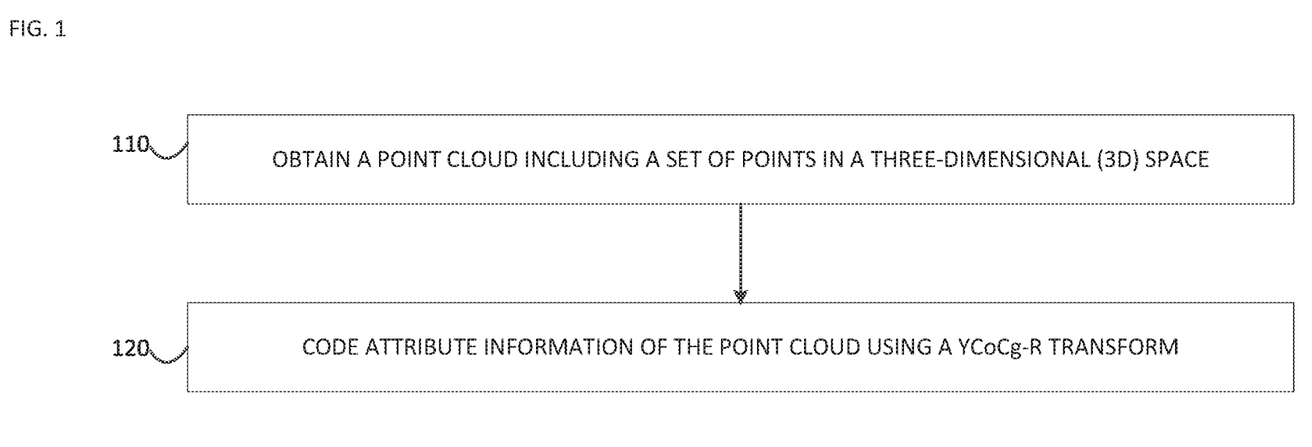
FIG. 1 is a flowchart of an example process for coding attribute information of a point cloud.

FIG. 1 is a flow chart of an example process 100 for coding attribute information of a point cloud. In some implementations, one or more process blocks of FIG. 1 may be performed by user device 210. In some implementations, one or more process blocks of FIG. 1 may be performed by another device or a group of devices separate from or including user device 210, such as platform 220.

As shown in FIG. 1, process 100 may include obtaining the point cloud including a set of points in a three-dimensional space (block 110).

The point cloud may be a set of points in a 3D space, each with associated attributes, e.g. color, material properties, etc.

As further shown in FIG. 1, process 100 may include coding the attribute information of the point cloud using a YCoCg-R transform (block 120).

The YCoCg color model is the color space formed from a simple transformation of an associated red, green, blue (RGB) color space into a luma value (denoted as "Y") and two chroma values called chrominance green (Cg) and chrominance orange (Co). YCoCg-R is a reversible scaled version of the YCoCg color model.

The YCoCg-R transform may be used for graph-based point cloud compression (G-PCC). In the YCoCg-R, Co=R−B. Further, t=B+(Co>>1). Further still, Cg=G−t. Further still, Y=t+(Cg>>1).

The YCoCg transform is given as follows:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

As a lossless transform derived from YCoCg, the forward YCoCg-R is given as follows:

$Co=R-B$ $t=B+(Co>>1)$ $Cg=G-t$ $Y=t+(Cg>>1)$

The backward YCoCg-R reverses the above process as follows:

$t=Y-(Cg>>1)$ $G=Cg+t;$ $B=t-(Co>>1)$ $R=B+Co$

In some implementations, the process may include transmitting the point cloud based on coding the attribute information using the YCoCg-R transform.

Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

Figure 2:
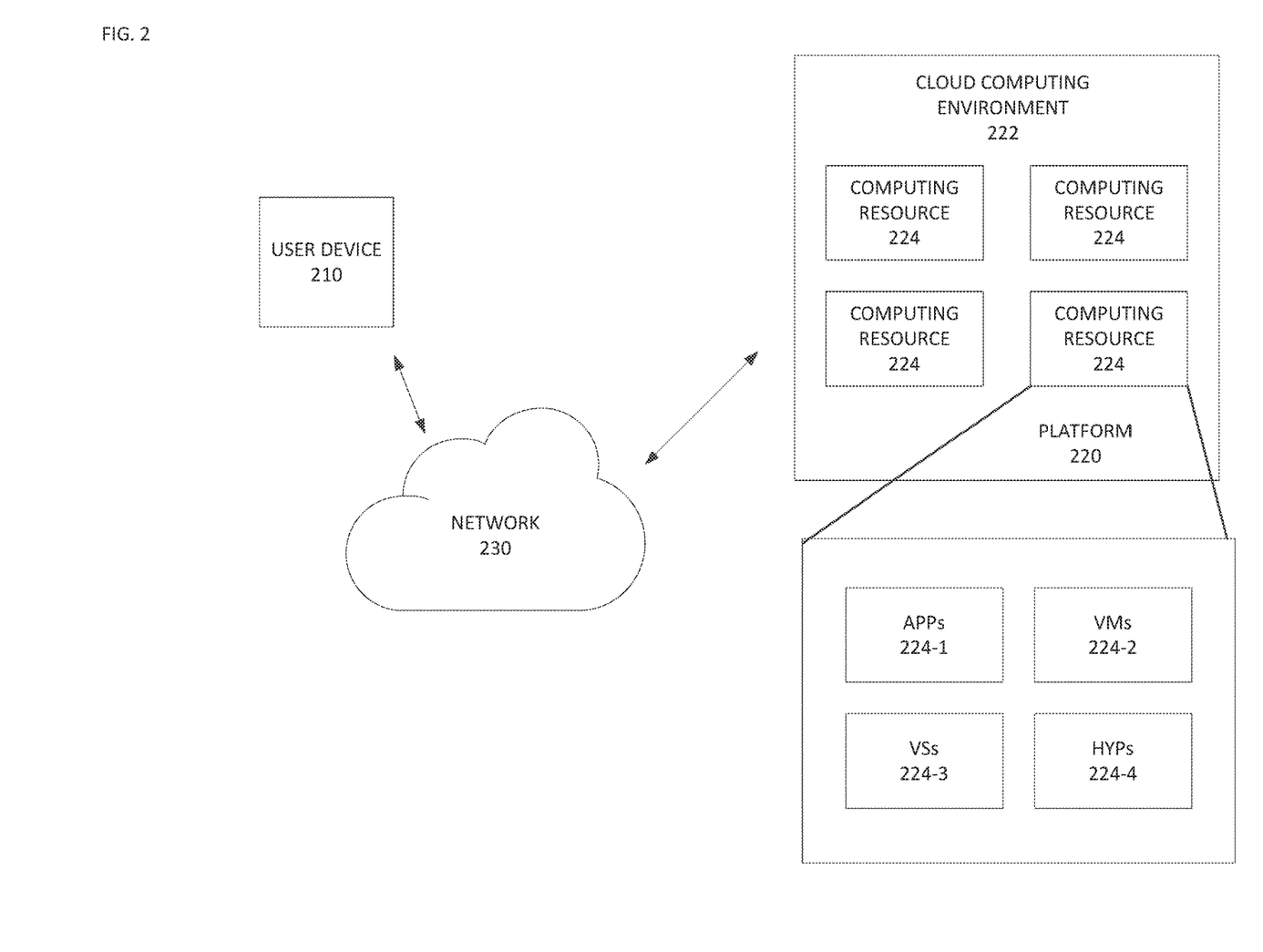
FIG. 2 is a diagram of an example environment in which systems and/or methods, described herein, may be implemented.

FIG. 2 is a diagram of an example communication system 200 in which systems and/or methods, described herein, may be implemented. As shown in FIG. 2, communication system 200 may include a user device 210, a platform 220, and a network 230. Devices of communication system 200 may interconnect via wired connections, wireless connections, or a combination of wired and wireless connections.

The communication system 200 may support unidirectional transmission of data. For example, a first user device 210 may code video data at a local location for transmission to a second user device 210 via the network 230. The second user device 210 may receive the coded video data of the first user device 210 from the network 230, decode the coded data and display the recovered video data. Unidirectional data transmission may be common in media serving applications, and the like.

The communication system 200 may support bidirectional transmission of data. For example, the communication system 200 may support bidirectional transmission of coded video that may occur, for example, during videoconferencing. For bidirectional transmission of data, each user device 210 may code video data captured at a local location for transmission to the other user device 210 via the network 230. Each user device 210 also may receive the coded video data transmitted by the other user device 210, may decode the coded data and may display the recovered video data at a local display device.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of providing information to user device 210, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
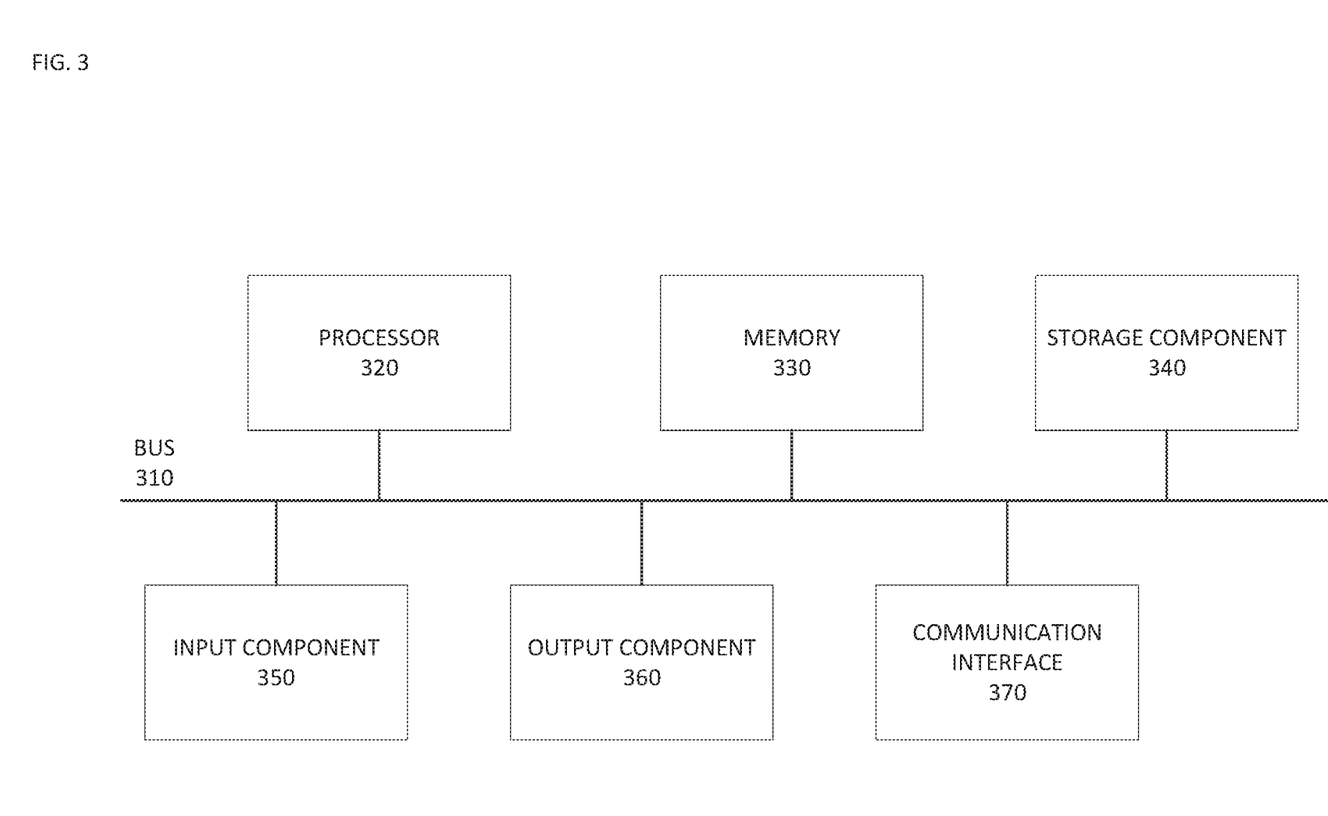
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for coding attribute information of a point cloud, the method performed by at least one processor and comprising:
   obtaining the point cloud including a set of points in a three-dimensional space; and
   coding the attribute information of at least one point of the point cloud using a YCoCg-R transform as a lossless inloop transform of prediction residuals of the at least one point and based on determining to use the lossless inloop transform of prediction residuals of the at least one point by a conditional check comprising at least one of:
      determining whether a number of neighboring points to the at least one point experience any of reduced residual magnitude and reduced residual variance by application of the YCoCg-R transform as the lossless inloop transform of prediction residuals to ones of the neighboring points,
      determining a maximum absolute difference in channel values of the neighboring points, and
      determining interchannel correlation from the neighboring points.

2. The method of claim 1, further comprising:
   transmitting the point cloud based on coding the attribute information using the YCoCg-R transform.

3. The method of claim 1, wherein the YCoCg-R transform is used for graph-based point cloud compression (G-PCC).

4. The method of claim 1, wherein Co=R−B.

5. The method of claim 4, wherein t=B+(Co>>1).

6. The method of claim 5, wherein Cg=G−t.

7. The method of claim 6, wherein Y=t+(Cg>>1).

8. A device for coding attribute information of a point cloud, the device comprising:
   at least one memory configured to store program code; and
   at least one processor configured to read the program code and operate as instructed by the program code, the program code including:
      obtaining code configured to cause the at least one processor to obtain the point cloud including a set of points in a three-dimensional space; and
      coding code configured to cause the at least one processor to code the attribute information of at least one point of the point cloud using a YCoCg-R transform as a lossless inloop transform of prediction residuals of the at least one point and based on determining to use the lossless inloop transform of prediction residuals of the at least one point by a conditional check comprising at least one of:
  determining whether a number of neighboring points to the at least one point experience any of reduced residual magnitude and reduced residual variance by application of the YCoCg-R transform as the lossless inloop transform of prediction residuals to ones of the neighboring points,
  determining a maximum absolute difference in channel values of the neighboring points, and
  determining interchannel correlation from the neighboring points.

9. The device of claim 8, wherein the program code further includes:
  transmitting code configured to cause the at least one processor to transmit the point cloud based on coding the attribute information using the YCoCg-R transform.

10. The device of claim 8, wherein the YCoCg-R transform is used for graph-based point cloud compression (G-PCC).

11. The device of claim 8, wherein Co=R−B.

12. The device of claim 11, wherein t=B+(Co>>1).

13. The device of claim 12, wherein Cg=G−t.

14. The device of claim 13, wherein Y=t+(Cg>>1).

15. A non-transitory computer-readable medium storing instructions, the instructions comprising: one or more instructions that, when executed by one or more processors of a device for coding attribute information of a point cloud, cause the one or more processors to:
  obtain the point cloud including a set of points in a three-dimensional space; and
  code the attribute information of at least one point of the point cloud using a YCoCg-R transform as a lossless inloop transform of prediction residuals of the at least one point and based on determining to use the lossless inloop transform of prediction residuals of the at least one point by a conditional check comprising at least one of:
  determining whether a number of neighboring points to the at least one point experience any of reduced residual magnitude and reduced residual variance by application of the YCoCg-R transform as the lossless inloop transform of prediction residuals to ones of the neighboring points,
  determining a maximum absolute difference in channel values of the neighboring points, and
  determining interchannel correlation from the neighboring points.

16. The non-transitory computer-readable medium of claim 15, wherein the one or more instructions further cause the one or more processors to transmit the point cloud based on coding the attribute information using the YCoCg-R transform.

17. The non-transitory computer-readable medium of claim 15, wherein Co=R−B.

18. The non-transitory computer-readable medium of claim 17, wherein t=B+(Co>>1).

19. The non-transitory computer-readable medium of claim 18, wherein Cg=G−t.

20. The non-transitory computer-readable medium of claim 19, wherein Y=t+(Cg>>1).

* * * * *